United States Patent [19]

Nevrekar

[11] Patent Number: 5,662,308

[45] Date of Patent: Sep. 2, 1997

[54] EXPANDING GATE VALVE ASSEMBLY

[76] Inventor: Venkatesh R. Nevrekar, 6 Castle Creek Pl., Shawnee, Okla. 74801

[21] Appl. No.: 631,957

[22] Filed: Apr. 15, 1996

[51] Int. Cl.$^6$ .................................................... F16K 3/14
[52] U.S. Cl. ............................................. 251/204; 251/195
[58] Field of Search ................................. 251/195, 199, 251/203, 204

[56] References Cited

U.S. PATENT DOCUMENTS

| | | | |
|---|---|---|---|
| 1,245,961 | 11/1917 | Oswald | 251/195 |
| 2,858,844 | 11/1958 | Gemma | 251/204 X |
| 3,662,986 | 5/1972 | Domulewicz, Sr. | 251/195 X |

*Primary Examiner*—John Fox

[57] ABSTRACT

An expanding gate valve which includes a reciprocating gate supporting at least one floating segment supported on one side thereof with a wedging means between the gate and the segment for wedging movement of the segment transverse to the fluid flow path and further wedging the segment against a valve body seating surface upon reciprocating movement of the gate in selective response to valve stem movement so as to seal the fluid flow passageway from the valve body cavity selectively in a fluid flow closed position or in a fluid flow open position of the valve, wherein the floating segment comprises a first wedging surface configured to coact with the gate and a second wedging surface to coact with the valve seating surface.

6 Claims, 2 Drawing Sheets

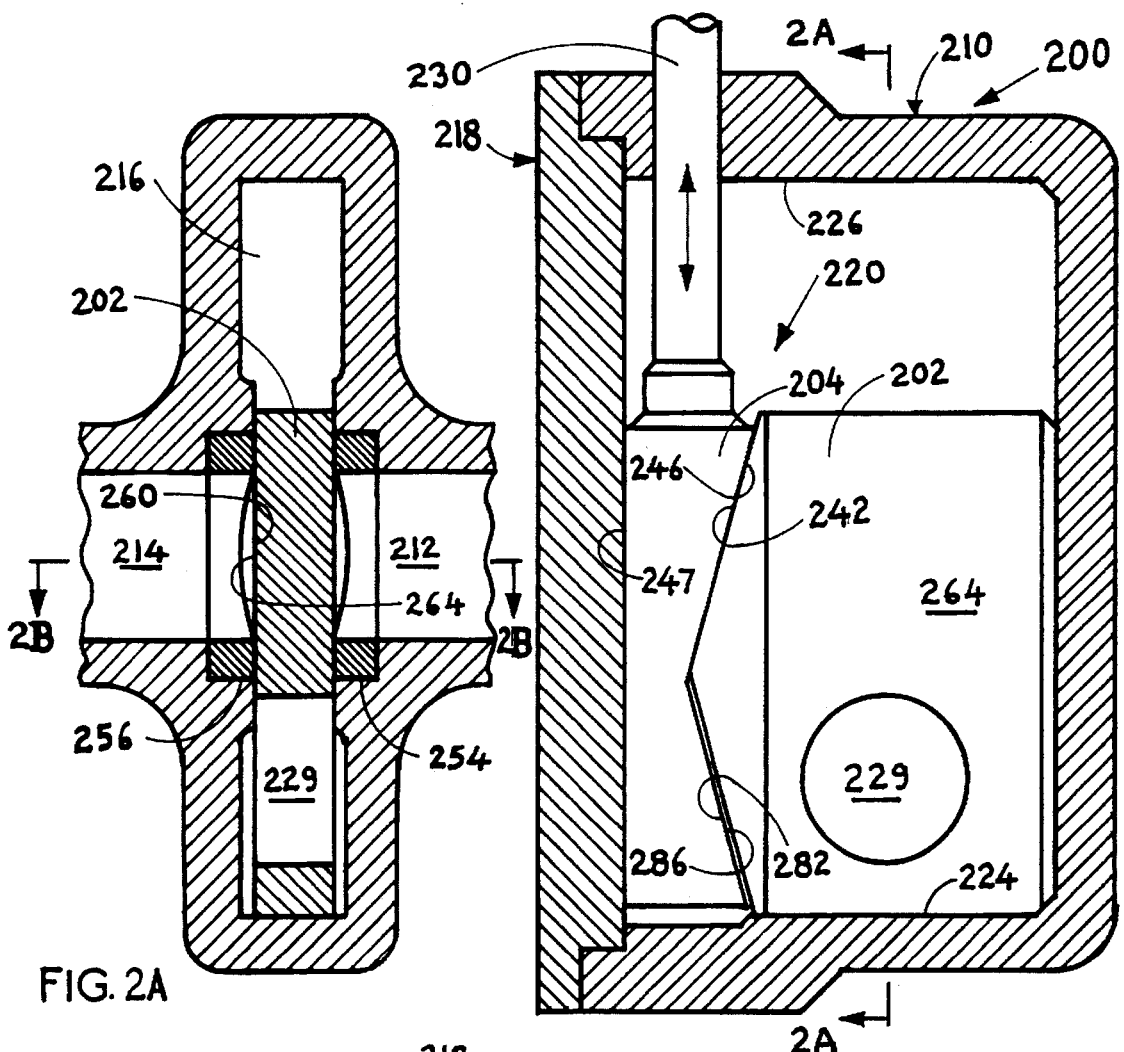
FIG. 2
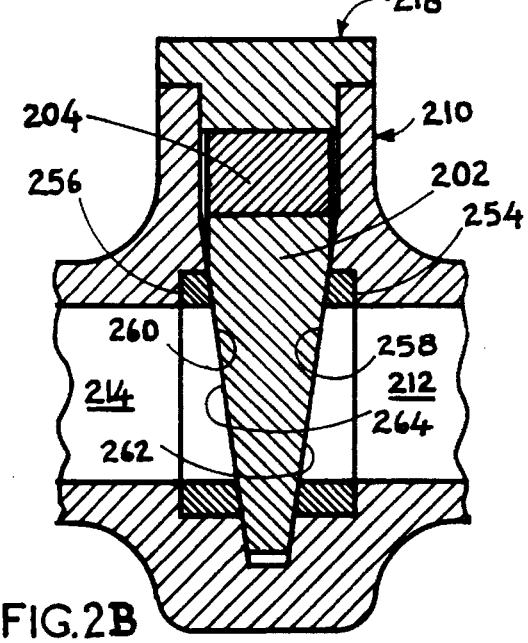
FIG. 2A
FIG. 2B
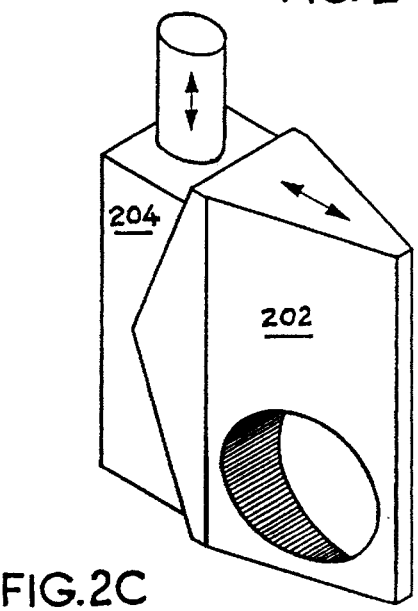
FIG. 2C

EXPANDING GATE VALVE ASSEMBLY

BACKGROUND OF THE INVENTION

1. Field of the Invention

The present invention relates generally to valves having an expanding gate assembly, and more particularly but not by way of limitation, to an expanding gate valve which includes a valve closure member carrying a movable segment which moves relative to the valve closure member to effect sealed closure of the valve.

2. Brief Description of Prior Art

Valves with expanding gates have been taught in the prior art, wherein such valves comprise a gate having a female V-surface formed on the upstream side of the gate, a floating segment mounted on the gate with a complementary male V-surface disposed thereon to engage and coact with the female V-surface of the gate. The male/female V-surfaces constitute wedging means. This gate assembly is positioned between the seating surfaces on the valve body surrounding the fluid flow passageway to move transverse to the fluid flow path denoted by the fluid flow passageway.

The movement of the gate assembly transverse to the flow path causes the floating segment to contact a stop structure which arrests further movement of the segment. As the gate continues to move further, the segment is wedged outwardly away from the gate to sealingly engage the valve seating surface. This wedging movement of the segment is effected by the sliding action of the corresponding legs of the V-surfaces of the gate and the segment. When the gate assembly is moved in the opposite direction to open the valve, the segment is caused to collapse upon and nest with the gate in the complementary interfitting V-surfaces. In a nested configuration of the segment with the gate, the segment is fully retracted towards the gate and can move no further towards the gate after the wedging forces are relieved. This is the characteristic of a floating segment.

For smooth and easy operation, and to avoid damage to the valve, it is important that the wedging action of the gate-segment occur in only open or closed position of the valve, and that the segment remain in the collapsed condition when the gate is moving between the open and closed positions of the valve assembly. This prevents unnecessary dragging or binding of the gate assembly against the valve seats at a time when high integrity sealing is not essential. Pre-expansion of the segment during gate travel, referred to as back-wedging, can require excessive force on the stem to operate the valve, causing the valve assembly to jam, or cause failure of the stem.

The expanding gate valve is widely used in the Oil and Gas Industry for several decades. Fluid pressure as high as 20,000 psi is encountered in the deep well drilling area of the Oil & Gas Industry. However, even with its popularity in the Oil & Gas Industry for being able to handle high fluid pressure, the expanding gate valve has deficiencies. For one, it is an unidirectional valve in which the segment must be placed upstream only. The smooth operation of the valve is dependent on collapsing ability of the segment, which if placed downstream cannot collapse. Secondly, when the gate-segment assembly reciprocates between open and closed positions, the full force due to upstream fluid pressure acting on the segment is transferred to the downstream seat. As a result, the stem has to exert enough force to overcome the frictional resistance force between the gate and the downstream seat. To get an idea of the magnitude of this frictional force, consider a valve of 2 in. nominal dieter with fluid pressure of 10,000 psi. The fluid pressure exerts a force of over 15 tons on the downstream seat. With a coefficient of friction of 0.2 between the gate and the downstream seat, the 15 ton force translates into a stem force of 3 tons. With fluid pressure of 20,000 psi, figures are twice as large. The stem force is even larger if frictional resistance is encountered at the upstream seat. Thirdly, a gate valve is susceptible to a condition known in the trade or art as "pressure lock". Fluid pressure leakage past the valve seats can be trapped in the valve chamber with the result that the gate member is pressure locked against operating movement. To return the valve to normal operation, the valve chamber fluid pressure must be vented. Fourthly, sediments in the fluid can escape through the slit between the gate and the segment in the conduit portion of the gate assembly to the valve chamber, where it accumulates thereby creating an impediment to smooth operation of the valve. A frequent problem with prior art valve is that the gate segment assembly becomes jammed between the valve body seats. The segment expands in a direction parallel to the fluid flow path and in order to close the valve, the gate opened with ease when the gate/segment assembly is jammed between the valve body needs to exert tremendous wedging forces upon the valve body seats to counter the full force due to fluid pressure. The segment does not collapse and the valve cannot be seats.

SUMMARY OF THE INVENTION

The present invention provides an expanding gate valve having a valve body with a body cavity and a fluid flow passageway therethrough defining a fluid flow path. The valve body comprises a valve seating surface surrounding the fluid flow passageway and a reciprocating flow control means consisting of at least one floating segment mounted on a gate is disposed in the body cavity to open or close the fluid flow passageway. The segment comprises a sealing surface for wedging against the valve seating surface. A first wedging means is interposed between the gate and the segment for wedging the segment outwardly away from the gate and further for wedging the sealing surface against the valve seating surface to close the fluid flow passageway. The wedging movement of the segment takes place transverse to the fluid flow path, unlike prior art in which the wedging movement of the segment takes place parallel to the fluid flow path.

In one embodiment of the present invention, the segment comprises a fluid flow conduit alignable with the fluid flow passageway and a second wedging means, opposite to the first wedging means, is disposed between the gate and the segment. The first wedging means engages when the gate reciprocates in one direction and the second wedging means wedges the conduit portion of the segment against the valve seating surface when the gate reciprocates in the opposite direction to open the valve.

With this novel structure in which the wedging movement of the segment takes place transverse to the fluid flow path, the full load due to fluid pressure does not act on the gate when the the gate reciprocates between open and closed positions of the valve. Fluid pressure acts on the inclined surface of the segment and only a component of this force due to fluid pressure is exerted on the gate across the wedging surface. Thus a lower stem force is required to operate the valve. Fluid can flow in either direction of the segment making the valve of the present invention a truly bi-directional valve. There is no slit in the conduit portion of the segment of the present invention for sediments to escape to the valve chamber. Thus, the present invention minimizes the deficiencies of the expanding gate valve of prior art.

In the present invention, the segment moves transverse to the fluid flow path and therefore a smaller force—smaller than full force due to fluid pressure, acts on the segment in the direction of wedging movement of the segment. The gate therefore needs to exert a smaller wedging force to close the valve than when the segment moves parallel to the fluid flow path against the full force due to fluid pressure. The segment of the present invention therefore can collapse with greater ease than the segment of prior art and the valve can be opened with less difficulty.

An object of the present invention is to provide an expanding gate valve assembly which requires less running torque.

Another object of the present invention is to provide a bi-directional expanding gate valve assembly.

Yet another object of the present invention is to provide an expanding gate: valve assembly which prevents debris in the fluid from accumulating in the valve chamber.

Other objects and advantages of the present invention will be apparent as the following detailed description of the invention is read in conjunction with the accompanying drawings and appended claims.

BRIEF DESCRIPTION OF THE DRAWINGS

FIG. 2 is a side elevational, diagrammatic view of an expanding gate valve assembly constructed in accordance with the present invention.

FIG. 2A is a cutaway side elevational view taken generally at 2A—2A in FIG. 2.

FIG. 2B is a cutaway top view taken generally at 2B—2B in FIG. 2A.

FIG. 2C is a an isometric view of the gate/segment assembly to show how the combination would look like in FIG. 2.

DETAILED DESCRIPTION

Figure 1:
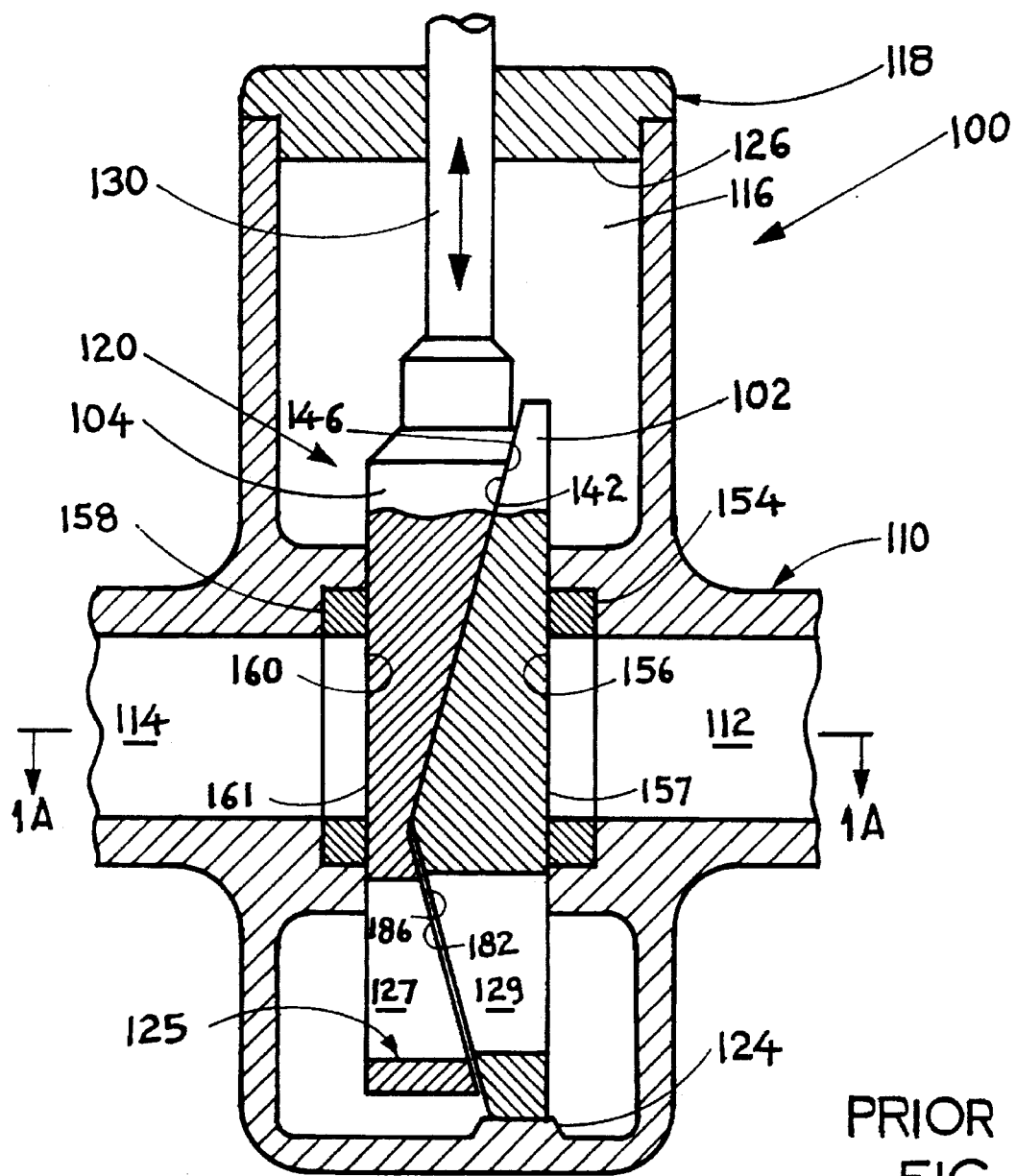
FIG. 1 is a side elevational, diagrammatic view of a prior art expanding gate valve assembly.
Figure 1A:
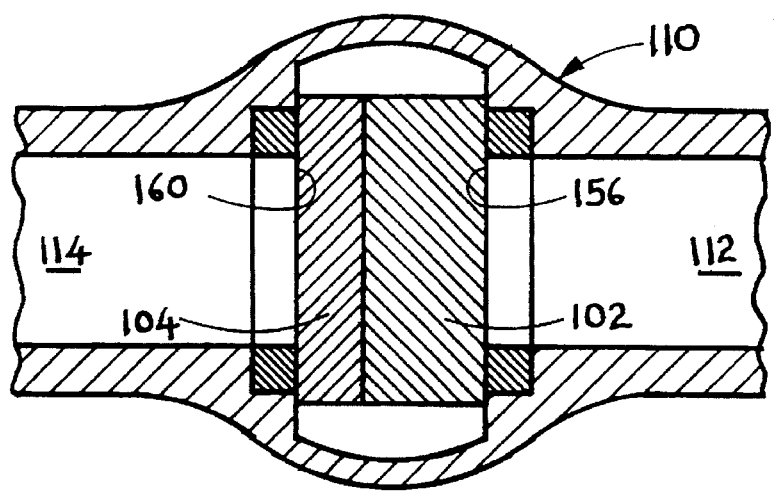
FIG. 1A is a cutaway top view taken generally at 1A—1A in FIG. 1.

Referring to FIG. 1 of the drawings, a prior art expanding gate valve assembly 100 includes a valve body 110 with a fluid flow passageway 112–114 intersecting a body cavity 116 in which a gate assembly 120 is placed. An upstream seat ring 154 and a downstream seat ring 158 are placed on opposite sides of the gate assembly surrounding the fluid flow passageway. The gate assembly 120 comprises a gate 104 and a segment 102 mounted upstream on the gate 104 which is secured to the stem 130 for movement therewith in a direction normal to the fluid flow path denoted by fluid flow passageway 112–114 through the valve body. The gate 104 has a downstream face 161 to sealingly engage the valve seating surface 160 of the downstream seat ring 158 and an upstream face 146 which is deeply indented with a female V-surface with a pair of intersecting legs 146 and 186.

The movable segment 102 has an upstream face 157 to sealingly engage the valve seating surface 156 of the upstream seat ring 154 and a downstream face 142 which is provided with a male V-surface having a pair of intersecting legs 142 and 182. The male V-surface 142/182 is complementary to the female V-surface 146/186 of the gate 104. A fluid flow bore 125 through the lower portion of the gate 104 and the segment 102 is formed by an opening 127 through the gate 104 in alignment with opening 129 in the segment 102. The movable segment 102 is shown expanded into firm sealing contact with the upstream valve seating surface 156 and the gate 104 is shown is shown into firm sealing contact with the downstream valve seating surface 160.

After the gate 104 and the segment 102 have moved together in a nested configuration transverse to the fluid flow path 112–114, the segment 102 will strike a stop element 126 so that it can no longer move with the gate 104. The segment 102 them will be caused to expand away from the gate 104 by the wedging action between the Wedging surfaces 182 and 186, thereby causing the gate 104 to sealingly engage the downstream seating surface 160 and the segment 102 to sealingly engage the upstream seating surface 156, with the fluid flow bore 125 substantially aligned with the fluid flow passageway 112–114 to cause the valve to be opened. When the gate 104 and the segment 102 have moved together in the opposite direction in a nested configuration transverse to the fluid flow path 112–114, the segment will strike a lower stop element 124 so that it can no longer move with the gate 104. The segment 102 then will be caused to expand outwardly away from the gate 104 by the wedging action of the wedging surfaces 142 and 146, thereby causing the gate 104 to sealingly engage the downstream seating surface 160, and the segment 102 to sealingly engage the upstream seating surface 156, to cause the valve closed. The underside of the bonnet 118 may be used as the upper stop 126.

In FIG. 1, the segment 102 is placed on the upstream side of the gate 104 in order to facilitate collapsing of the segment 102 when the gate assembly 120 is moved from open to closed position and vice versa. If the segment is placed on the downstream side of the gate, the fluid pressure on the upstream side 112 forces the segment 102 hard against the downstream seating surface 160, thereby making the segment unable to move and extremely difficult to collapse. For this reason, the valve assembly 100 as shown in FIG. 1 is basically an unidirection valve with the segment placed on the upstream side of the gate. Full force due to upstream fluid 112 acts on the downstream seating surface 160. The stem 130 therefore has to exert enough force to overcome the frictional resistive force between the gate and the downstream seat. Another disadvantage of the prior art valve of FIG. 1 is that sediments in the fluid can escape to the valve chamber 116 through the slit at the wedge interface 182/186 of the fluid flow conduit 125. The accumulated debris can interfere with smooth operation of the valve.

In the valve of FIG. 1, the segment 102 moves parallel to the fluid flow path 112–114. The gate 104 needs to exert tremendous wedging forces upon the valve body seats 156, 160 for closing the valve in order to counter the full force due to fluid pressure. Therefore the segment 102 cannot collapse with ease when opening the valve; and the gate/segment assembly 104/102 gets jammed between the valve body seats 156/160 and the valve cannot be opened without difficulty. This problem with prior art valve is overcome in the present invention by making the segment move perpendicular to the fluid flow path thereby the gate requiring less wedging force in order to close the valve.

FIGS. 2, 2A, 2B, 2C show an expanding gate valve assembly 200 constructed in accordance with features of the present invention.

A valve body 210 includes fluid flow passageway 212–214 on opposite sides of the valve body cavity 216 which is in fluid communication with the fluid flow passageway 212–214. The valve body cavity 216 also opens to the interior of the bonnet 218. The valve body has a valve seating surface 260 located on one side of the valve body facing the body cavity 216 surrounding the fluid flow passageway 214. The fluid flow passageway denotes a fluid flow path intersecting the body cavity 216. The valve seating surface is disposed inclined to the fluid flow path. A valve seat ring 256 comprising a valve seating surface 260 facing the body cavity 216 is placed along the fluid flow passageway 214.

A flow control assembly 220 is placed in the body cavity 216 for selectively closing and opening the fluid flow passageway 214 and comprises a gate 204 and a floating segment 202 is disposed on the gate 204. The gate 204 has a first face 246 on one side facing the fluid flow path 212–214. The floating segment 202 has a sealing surface 264 on one side facing the inclined valve seating surface 260 and to sealingly engage therewith for closing the fluid flow passageway 214 and a gate-contacting face 242 facing the first face 246 of the gate 204. The first face of the gate and the gate contacting face of the floating segment togeter comprise a first wedging means 242/246

A valve operator means is provided for selectively reciprocating the flow control assembly 220 to a flow closed position or to a flow open position. The valve operator means comprises a stem 230 having a stem axis that is disposed transverse to the fluid flow path 212–214 and parallel to the inclined valve seating surface 260. The stem 230 is connected to the flow control assembly 220 by a connecting moans that permits reciprocating motion of the flow control means along the stem axis. A valve operator (not shown) in the form of a lever or a handwheel is connected to the stem for selectively moving the stem. A stem moving means (not shown) is associated with the valve operator and the stem. The stem moving means causes the stem 230 to selectively move in a sequence of steps that ends with only axial motion of the stem in response to movement of the valve operator in one direction, and begins with only axial motion of the stem in response to movement of the valve operator in opposite direction. A valve operator and a stem moving means are generally con, non items of operating a valve and therefore are not shown in FIG. 2 for the sake of simplicity. The first wedging means 242/246 is disposed inclined to the stem axis and becomes engaged when the segment 202 strikes a lower stop element 224, thereby causing segment 202 to wedge outwardly away from the gate 204 and move in a direction perpendicular to the fluid flow path 212–214.

When the valve operator is moved in one direction, the gate 204 and the segment 202 move together in a nesting configuration therewith until the segment 202 strikes a lower stop element 224 so that the segment can no longer move with the gate. The gate 204 then will be caused to be loaded with an axial force by the stem thereby wedging the segment 202 outwardly away from the gate and further causing the segment 202 to wedge against the inclined valve seating surface 260 to sealingly engage therewith for closing the fluid flow passageway 214. When the valve operator is moved the opposite direction, the gate 204 is substantially unloaded of axial force from the stem, the wedging forces are relieved at the wedging interface 242/246 and also at the wedging interface 260/264, and the segment 202 collapses towards the gate 204. With further movement of the valve operator in the same direction, the segment moves together with the gate in a nesting configuration therewith whereby the flow control assembly 220 is moved out of the fluid flow path 212–214 to open the fluid flow passageway 214.

In any wedging action between two elements, the wedge angle determines the wedging force and the displacement of the wedged element, and an optimum wedge angle is chosen to obtain the desired objective. Furthermore, the ease With which a segment collapses is largely dependent on the wedge angle between the segment and the gate. The segment can collapse only when the wedge angle is greater than the angle of repose for the materials, and larger the wedge angle, better the collapsing ability of the segment. However, with a larger wedge angle, a higher stem force is required. So a compromise is usually made between the wedge angle and the degree of collapsing ability desired. It should be clearly understood here that in the present invention, two distinct and simultaneous wedging actions are involved, one at the gate/segment interface 246/242 and the other at the segment/ valve seat interface 264/260 respectively, and the wedging movement takes place perpendicular to the fluid flow path.

In one embodiment of the present invention, the segment 202 comprises a fluid flow conduit therethrough alignable with the fluid flow passageway 212–214 in the fluid flow open position of the flow control means 220 and is denoted by 229.

In another embodiment of the present invention, the flow control means 220 comprises a second wedging means between the gate and the segment and is denoted by by the interface 286/282 which is disposed in a direction opposite to the first wedging means 246/242. The sealing surface 264 on the segment 202 extends further to the fluid flow conduit portion surrounding the fluid flow conduit 229 and facing the valve seating surface 260. When the valve operator is moved further in the opposite direction as indicated hereinabove, the segment 202 moves together with the gate 204 in a nesting configuration therewith until the segment 202 strikes an upper stop element 226 so that the segment can no longer move with the gate. The gate 204 then will be caused to be loaded with an axial force by the stem thereby wedging the segment 202 outwardly away from the gate 204 and further causing the segment 202 to wedge against the inclined valve seating surface 260 to sealingly engage therewith for opening the fluid flow passageway 214. In order to seal the fluid flow conduit 212–229–214 from the valve body cavity 216, the segment 202 comprises a second sealing surface 262 on a side of the segment opposite to the first sealing surface 264 and facing a second valve seating surface 258 on a second seat ring 254 that is disposed along the fluid flow path surrounding the fluid flow passageway 212. This way when the segment 202 is wedged into the valve seating surfaces 260 and 258, the fluid flow passageway 212–214 can be sealed from the valve body cavity 216 on either side of the segment 202 when such is desired. In this fashion fluid in the fluid flow passageway can be prevented from communicating with the valve chamber 216 in the fluid flow closed position of the valve assembly as well as in the fluid flow open position of the valve assembly. It will be interesting to note here that another set of wedging means can be disposed on the side 247 of the gate 204 opposite to the first face 246 and a second valve assembly in tandem with the first valve assembly can be operated by one stem 230 in FIG. 2.

The difference in construction of the structure between the present invention and the valve of prior art is clearly evident. In the present invention, the segment moves perpendicular to the fluid flow path during the wedging action between the gate and the segment, whereas in prior art the segment moves parallel to the fluid flow path during the wedging action between the gate and the segment. The present invention is therefore novel and not obvious over prior art.

The present invention has many distinct advantages over prior art. Fluid pressure acts on the inclined sealing surface 262 and only a component of this force due to fluid pressure acts on the gate 204 through the wedging interface 246/242. In prior art, full force due to fluid pressure acts on the gate through the wedging interface 146/142 of FIG. 1. Therefore, in the present invention a smaller stem force is required than in the valve of prior art. The valve of the present invention is truly a bi-directional valve since fluid pressure can act on either side of the segment of the present invention without impairing the collapsibility of the segment. This cannot be said of prior art. In the present invention, the conduit 229 of the segment 202 does not have a slit through which debris can escape to the valve chamber 216, unlike prior art in which the wedging interface cuts across the fluid flow conduit.

Another very important advantage of the present invention is that the side 247 of the gate 204 opposite the wedging face 246 does not face the downstream seat. In prior art, the gate side opposite the wedging side faces the downstream seat. Therefore, in the present invention, it is feasible to attach friction reducing means to the side 247 of the gate 204 for minimizing the frictional resistance to gate movement. Such means could be a PTFE lining.

It should be clearly understood here that the wedging means between the gate and the segment, such as the interface 246/242 and the interface 286/282, are shown as planar surfaces in FIG. 2. Such planar surfaces are shown for the sake of simplicity. However, different kinds of other wedging means are available and can be used to effect a wedging action between the segment 202 and the gate 204.

FIG. 2C merely shows an isometric view of the gate/segment combination to see how the configuration would look like.

In FIG. 2B, the valve body seating surfaces 260, 258 are shown inclined to the fluid flow path 212–214. Other equivalent structures can be used to give the segment 202 an equivalent wedging action transverse to the fluid flow path in order to seal around the fluid flow passageway 212–214 by mechanical means. For example, one or both valve body seating surfaces 260 and 258 can be constructed perpendicular to the fluid flow path 212–214, but an equivalent tapered seat ring made of elastomeric or other materials can be placed on the segment to give an equivalent wedging action. Since the wedging movement of the segment transverse to the fluid flow path 212–214 is very small, there are umpteen ways of arriving at an equivalent structure of the segment/valve body combination for the desired wedging action.

From the above description it is clear that the present invention is well adapted to carry out the objects and to attain the ends and advantages mentioned herein as well as those inherent in the invention. While presently preferred embodiments have been described for purposes of this disclosure, it will be understood that numerous changes maybe made which will readily suggest themselves to those skilled in the art and which are accomplished within the spirit of the invention disclosed and as defined in the appended claims.

I claim:

1. A valve comprising:
   a valve body having a body cavity with a fluid flow passageway therethrough defining a fluid flow path intersecting the body cavity, the valve body having a valve seating surface located on one side of the valve body facing the body cavity and surrounding the fluid flow passageway;
   a flow control means disposed in the body cavity for selectively closing and opening the fluid flow passageway, the flow control means comprising:
      a gate;
      a stem connected to the gate for selectively moving the flow control means; and
      a floating segment having a sealing surface configured to wedge against the valve seating surface, the floating segment supported on the gate with a first wedging means between the gate and the segment for causing a wedging movement of the segment in a direction transverse to the fluid flow path and further causing wedging of the sealing surface of the segment against the valve seating surface upon a reciprocating movement of the gate in one direction in selective response to valve stem movement so as to close the fluid flow passageway.

2. The valve of claim 1 wherein the segment further comprises a fluid flow conduit therethrough alignable with the fluid flow passageway.

3. The valve of claim 2 wherein the flow control means comprises a second wedging means between the gate and the segment, said second wedging means disposed in a direction opposite to the first wedging means for causing a wedging movement of the segment in a direction transverse to the fluid flow path and further causing wedging of the sealing surface of the segment against the valve seating surface upon a reciprocating movement of the gate in the opposite direction in selective response to valve stem movement so as to open the fluid flow passageway.

4. A valve comprising:
   a valve body having a body cavity with a fluid flow passageway therethrough defining a fluid flow path intersecting the body cavity, the valve body having a valve seating surface located on one side of the valve body facing the body cavity and surrounding the fluid flow passageway;
   a flow control means disposed in the body cavity for selectively closing and opening the fluid flow passageway, the flow control means comprising:
      a gate having a first face on a side of the gate facing the fluid flow path; and
      a floating segment disposed on the gate, the floating segment comprising:
         a sealing surface on one side of the segment to wedge against the valve seating surface for closing the fluid flow passageway; and
         a gate-contacting face of the segment facing the first face of the gate, the gate-contacting face of the segment and the first face of the gate together configured to comprise a first wedging means for causing a wedging movement of the segment in a direction transverse to the fluid flow path; and
   a valve operator means for selectively reciprocating the flow control means to a flow closed position or to a flow open position, the valve operator means comprising:
      a stem having a stem axis extending transversely to the fluid flow path, the stem connected to the flow control means by a connecting means that provides reciprocating motion of the flow control means.;
      a valve operator connected to the stem for selectively moving the stem; and
      a stem moving means associated with the valve operator and the stem, said stem moving means causing the stem to selectively move in a sequence of steps that ends with only axial motion in response to movement of the valve operator in one direction, and begins with only axial motion in response to movement of the valve operator in another direction, whereby
         movement of the valve operator in said one direction causes the gate to be loaded with an axial force by the stem thereby causing the first wedging means to move the segment outwardly away from the gate and further causing the sealing surface of the segment to wedge against the valve seating surface so as to sealingly close the fluid flow passageway, and movement of the valve operator in said another direction causes the gate to be substantially unloaded of axial force from the stem thereby causing the floating segment to collapse towards the gate and move together with the gate during a pre-determined interval of movement of the flow control means to open the fluid flow passageway.

5. The valve of claim 4 wherein the floating segment further comprises a fluid flow conduit therethrough alignable with the fluid flow passageway in the valve body.

6. The valve of claim 5 wherein the flow control means further comprises a second wedging means between the gate and the floating segment, said second wedging means disposed in a direction opposite to the first wedging means, whereby further movement of the valve operator in said another direction causes the gate to be loaded with an axial force by the stem thereby engaging only the second wedging means and causing the floating segment to move outwardly away from the gate and further causing the floating segment to wedge against the valve seating surface in a fluid flow open position of the flow control means.

* * * * *